Aug. 7, 1934.   L. F. NENNINGER ET AL   1,969,231
AUTOMATIC MILLING MACHINE
Filed April 4, 1932   6 Sheets-Sheet 1

Inventors
LESTER F. NENNINGER
FRED A. HASSMAN
By AHKParsons
Attorney

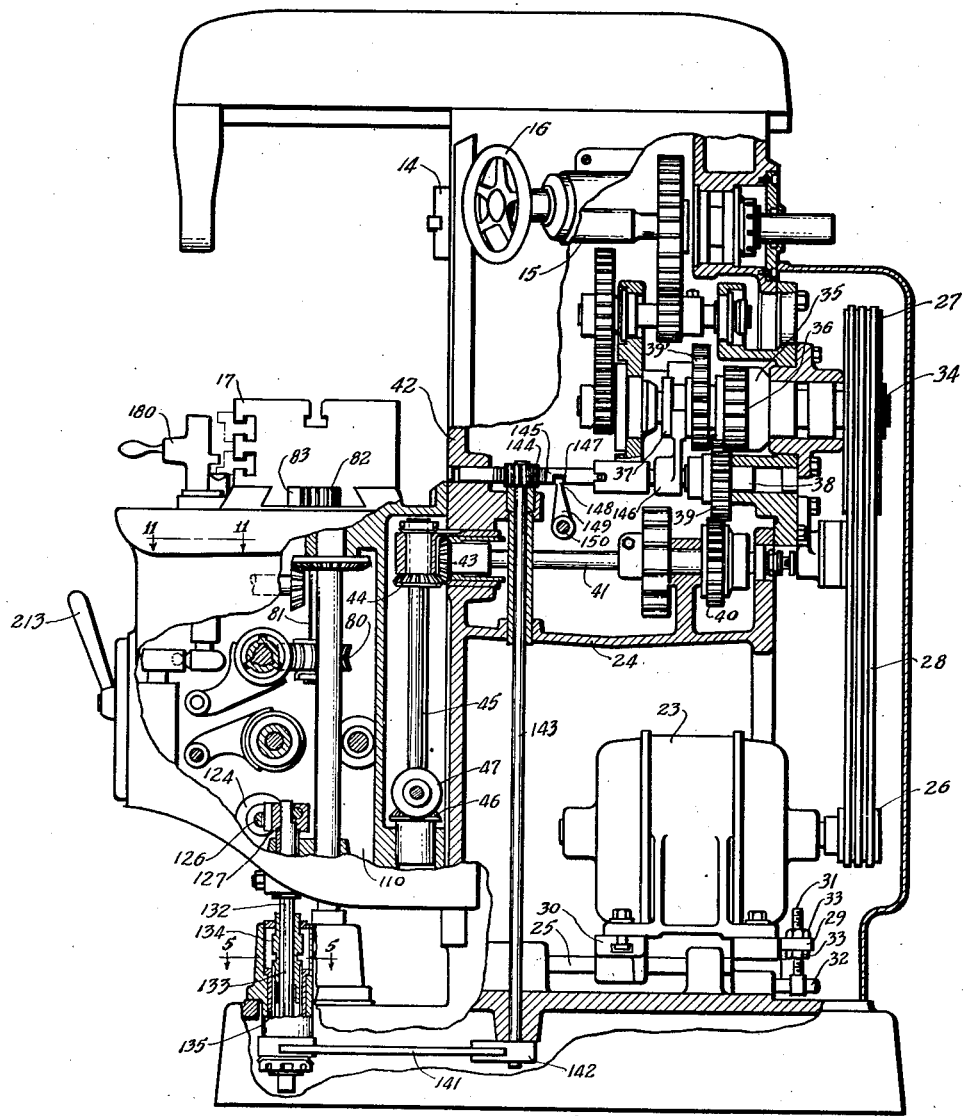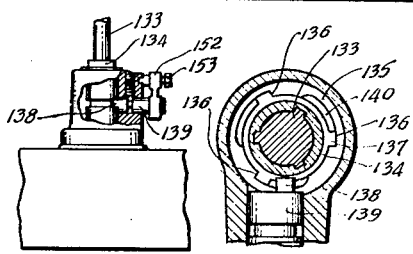

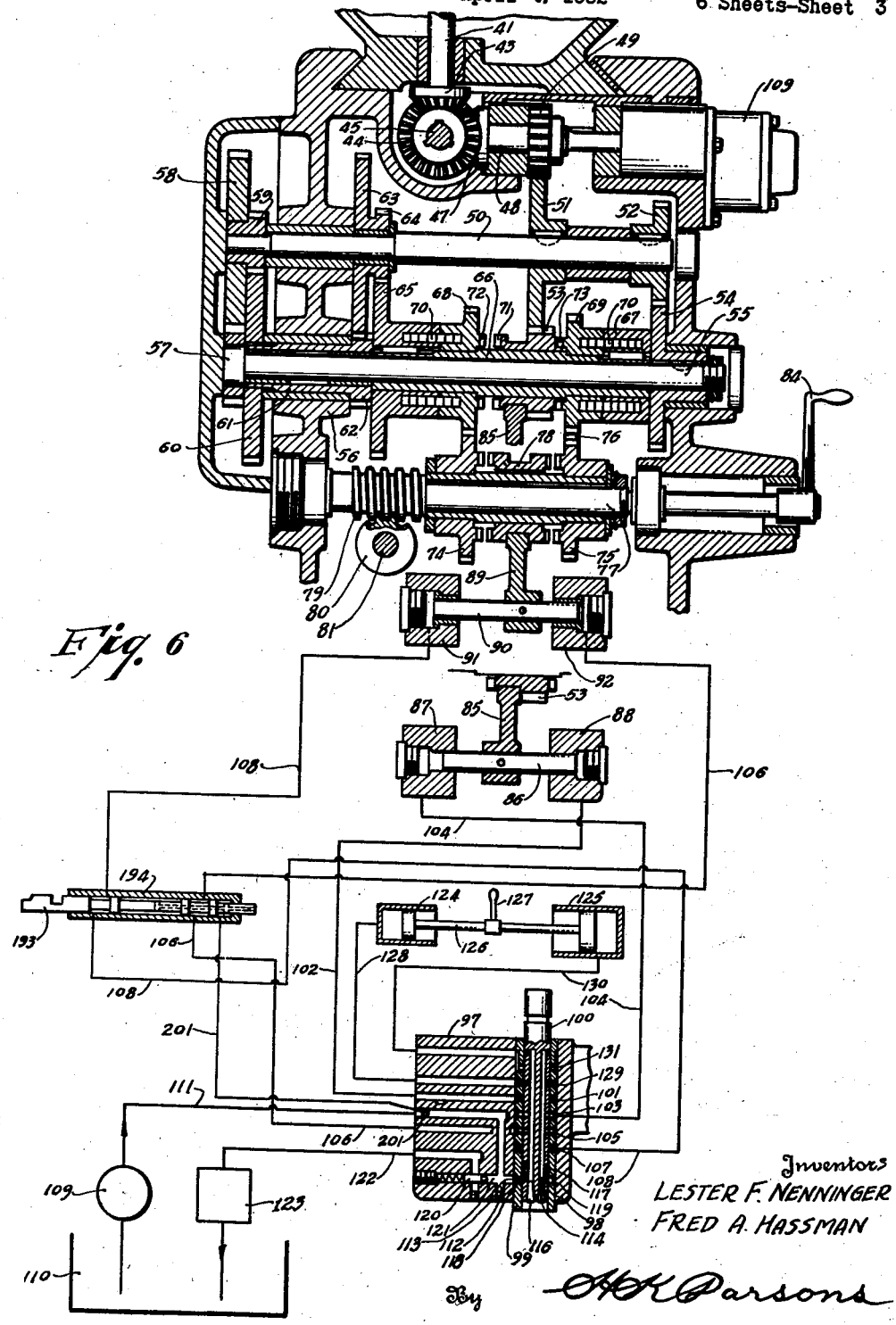

Aug. 7, 1934.  L. F. NENNINGER ET AL  1,969,231
AUTOMATIC MILLING MACHINE
Filed April 4, 1932   6 Sheets-Sheet 4

Inventors
LESTER F. NENNINGER
FRED A. HASSMAN

By A.K. Parsons
Attorney

Aug. 7, 1934.  L. F. NENNINGER ET AL  1,969,231
AUTOMATIC MILLING MACHINE
Filed April 4, 1932  6 Sheets-Sheet 5

Inventors
LESTER F. NENNINGER
FRED A. HASSMAN

By AHKParsons
Attorney

Aug. 7, 1934.  L. F. NENNINGER ET AL  1,969,231
AUTOMATIC MILLING MACHINE
Filed April 4, 1932   6 Sheets-Sheet 6
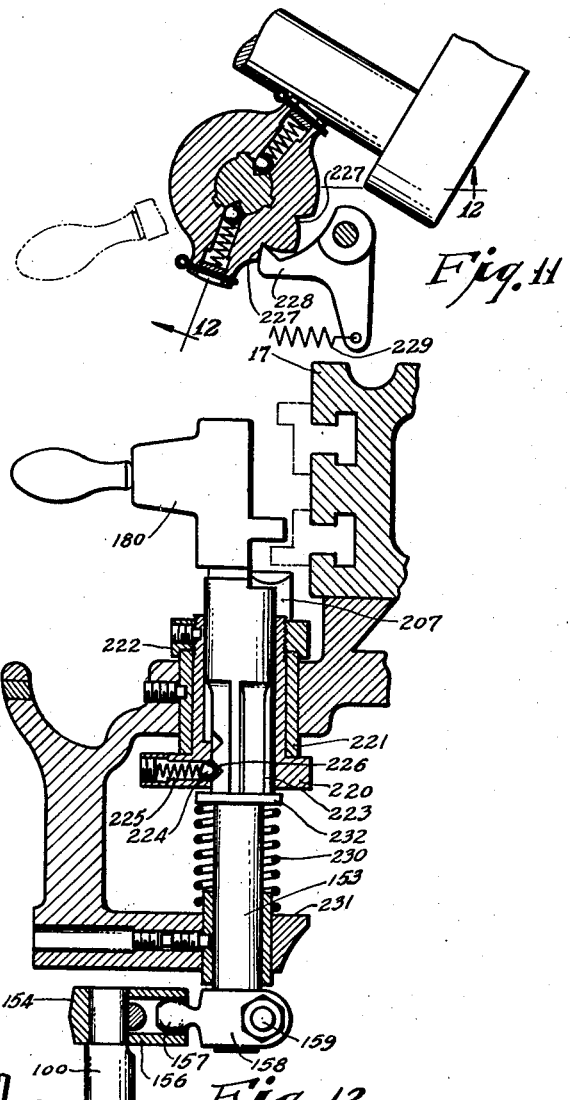
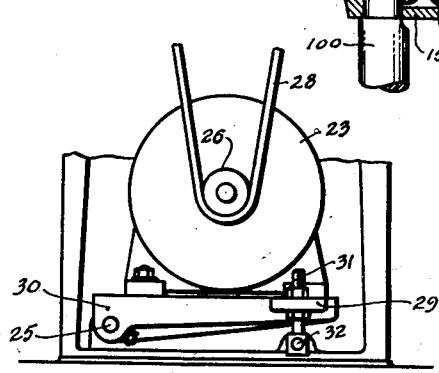
Inventors
LESTER F. NENNINGER
FRED A. HASSMAN
By
Attorney Patented Aug. 7, 1934

1,969,231

UNITED STATES PATENT OFFICE 1,969,231

AUTOMATIC MILLING MACHINE

Lester F. Nenninger and Fred A. Hassman, Cincinnati, Ohio, assignors to The Cincinnati Milling Machine Company, Cincinnati, Ohio, a corporation of Ohio Application April 4, 1932, Serial No. 602,919

28 Claims. (Cl. 90—21)

This invention relates to milling machines and more particularly to an improved transmission and control mechanism therefor.

One of the objects of this invention is to provide a simplified mechanical transmission for a milling machine having improved hydraulically actuated rate and direction control means therefor.

Another object of this invention is to provide a simplified and inexpensive milling machine having all the automatic cycles and control features of the more complicated and expensive machines.

A further object of this invention is to provide a single trip actuated valve for controlling hydraulic operation of the rate determining, direction determining and spindle stop mechanisms of a milling machine.

An additional object of this invention is to provide improved stop valve mechanism in combination with hydraulically actuated rate and direction control means, which is power actuable to a stop position under dog or manual control.

Other objects and advantages of the present invention should be readily apparent by reference to the following specification considered in conjunction with the accompanying drawings illustrative of one embodiment thereof but it will be understood that any modifications may be made in the specific structural details within the scope of the appended claims without departing from or exceeding the spirit of the invention.

Referring to the drawings in which like reference numerals indicate like or similar parts, Figure 1 is a side elevation of a milling machine embodying the principles of this invention.

Figure 3 is a side elevation of the machine partly in section showing the transmission therein.

Figure 4 is a detail view of the spindle stop connecting lever.

Figure 5 is a section on the line 5—5 of Figure 3.

Figure 6 is an expanded view of the transmission to the table and the control mechanism therefor.

Figure 11 is a section through the control plunger as viewed on line 11—11 of Figure 3.

Figure 12 is a section as viewed on the line 12—12 of Figure 11.

Figure 13 is a detail of the motor mount.

Figure 1:
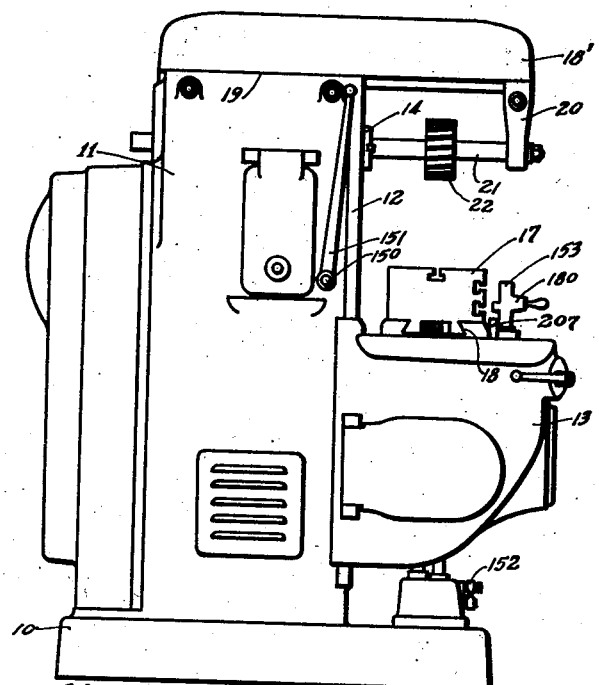

The reference numeral 10 in Figure 1 represents the base of a milling machine embodying the principles of this invention having a column 11 rising therefrom, upon one face of which is formed spaced vertical guideways 12 for receiving a support or knee 13. A cutter spindle 14, journaled in a quill 15, is mounted in the upper part of the column, the quill being axially adjusted by means of a hand wheel 16 to effect adjustment of the spindle toward and from the work. A work table 17 is reciprocably mounted in guideways 18 which are formed in the top surface of the knee 13 for guiding the table transversely of the cutter spindle 14. An over-arm 18' is axially adjusted in guideways 19 formed upon the top of the column, carrying a pendant or arbor support 20 in which is journaled the outboard end of a cutter arbor 21 bearing a cutter 22.

The cutter spindle 14 is actuated by a transmission shown more particularly in Figure 3, which in turn is actuated by a prime mover 23 mounted in the motor chamber 24 formed in the body of the column. The motor has a support which is pivotally mounted upon a shaft 25 parallel to the drive shaft 34 for varying the relative position of the motor pulley 26 with respect to the main drive pulley 27 to determine the tension of the power transmitting means 28, which in the present instant comprises a plurality of V belts. A lug 29 is formed integral with the motor support 30 for receiving a lock bolt 31 pivoted about a pin 32 fixed to the base of the machine, carrying a pair of lock nuts 33 one for determining adjustment in each direction. From the drawings it will be seen that there is one of these lock nuts on each side of the lug 29 whereby tightening of these nuts against the lug will hold the motor 23 in any adjusted position.

The main shaft 34 is journaled in the column and has the drive pulley 27 fixed upon one end for actuation by the prime mover, the shaft also carrying the main clutch 35 which has integrally formed therewith the table transmission drive gear 36 which is constantly rotated by the prime mover. A shiftable clutch spool 37 is mounted on the shaft for effecting engagement of the clutch and thereby coupling of the spindle transmission with the prime mover. From this it should be apparent that the table transmission is constantly driven by the prime mover uneffected by the clutch 35 while the spindle transmission is selectively connected therewith by the clutch spool 37. This makes it possible to stop rotation of the spindle during certain movements of the table, by automatic mechanism to be described hereafter.

The spindle transmission is more fully explained in copending application, Serial Number 597,189, filed on the 7th day of March, 1932 and since it forms no part of the present invention will not be described herein.

A stub shaft 38 is journaled in the column, parallel to the shaft 34, and carries a gear 39 meshing on one side with gear 36 and on the other side with gear 40, the latter being secured to the horizontal shaft 41. This shaft extends through the forward wall 42 of the column, where it is provided with bevel gear 43 meshing with bevel gear 44 splined on shaft 45 journaled in the knee as shown in Figure 6. The gear 44 is fixed with the column, while the splined shaft 45 is journaled in the knee for movement through the gear during upward and downward movement of the knee. This provides a power transmitting connection between the column and knee during all positions of the latter.

Attention is invited at this point to the fact that it may be desirable at times to have the table transmission under the control of the same clutch as the spindle transmission in which case the gear 39 may be reversed in its position on shaft 38 thereby meshing with gear 39' on one side and gear 40 on the other side. The gear 39' is coupled to the shaft 34 through the clutch 35, which makes possible joint control of the two transmissions.

A bevel gear 46 is secured to the end of the shaft 45 in mesh with a bevel gear 47 fixed to the end of shaft 48 journaled in the lower part of the knee and having upon the other end a spur gear 49. A second shaft 50 journaled transversely of the knee is driven by shaft 45 through a gear 51 meshing with gear 49, the gear 51 also meshing with clutch gear 53 of the rapid traverse transmission. A second gear 52 keyed to shaft 50 meshes with the gear 54 of the feed transmission. It will thus be seen that the common drive gear 49 actuates two branch transmissions, one of which is utilized to effect rapid traverse movement of the table, and the other for effecting power feed of the table.

The rate of the feed transmission is adapted to be varied by means of the following mechanism. The feed gear 54 is keyed to one end of a shaft 55 which extends transversely of the knee and through the side wall 56 thereof for receiving a change gear 57 keyed to the end thereof. This gear actuates a rate changer comprising the gears 58 and 59 mounted for free rotation on the projecting end of shaft 50 and the gear 60 which is keyed to a sleeve 61 surrounding the shaft 55. These gears are in serial power transmitting relationship to one another and may be inter-changed in various combinations or other gears substituted therefor to obtain a plurality of feed rates for the table.

A reduction gear train is provided on the interior of the knee comprising the gear 62 fixed to the sleeve 61 meshing with a gear 63 which has gear 64 integral therewith, these latter gears being mounted for free rotation on the shaft 50. The gear 64 meshes with the large gear 65 keyed to the sleeve 66. A driving member 67 is fixed on the opposite end of the sleeve 66 for rotation therewith. A pair of spaced gears 68 and 69 are mounted on the sleeve 66 and connected respectively with gear 65 and member 67 by means of over-drive friction clutches 70. Such clutches are well known in the art and need not be further described herein. It will be noted that the sleeve 66 is uni-directionally rotated and the over-drive clutches are therefore of such construction that during power rotation of the sleeve 66 they will effect rotation of the gears 68 and 69.

The clutch gear 53 which may be termed as a rate-determining clutch as well as the terminal member of the rapid traverse transmission is mounted for free rotation on the sleeve 66 between gears 68 and 69. Since the gear 53 forms part of the rapid traverse transmission it will be apparent that this gear rotates at a faster rate than either of the feed members 68 and 69. Therefore when the clutch teeth 71 are meshed with either the clutch teeth 72 of gear 68 or clutch teeth 73 of gear 69 these gears will be rotated at a faster rate than normally transmitted thereto by the over-drive clutch, and therefore slippage will take place in the clutches permitting gears 68 and 69 to be rotated faster than their respective drivers 65 and 67. This construction constitutes an over-drive transmission whereby the parts are normally rotated at a feed rate but upon clutching with the rapid traverse member they will be rotated at a faster rate to impart quick traverse to the table.

The member 68 meshes directly with gear 74, while the gear 69 rotates gear 75 through the intermediate idler 76 resulting in gears 74 and 75 being rotated in opposite directions. The gears 74 and 75 are mounted for free rotation relative to the shaft 77 which has splined thereto the direction determining clutch spool 78 which is axially shiftable to connect either of these gears to the shaft. A worm gear 79 is fixed to the shaft 77 in mesh with worm wheel 80, which is keyed to the end of a shaft 81 having a pinion 82 fixed to the upper end thereof in mesh with a rack 83 secured to the under-side of the table. From the foregoing it should be apparent that by means of the two shiftable clutches 53 and 78 that the rate and direction of power movement of the table may be readily determined.

The clutch 78 has a neutral position in which all power is disconnected from the table and therefore the shaft 77 is extended through the side of the knee where it is provided with a manually operated handle 84 by means of which the table may be manually adjusted during non-rotation of this shaft.

A complete automatic control mechanism has been provided for shifting the clutches 53 and 78 whereby different cycles of operation may be obtained, such as a continuous reciprocating cycle in which the table is moved at feed and rapid traverse rates in one direction, reversed, and moved at feed and rapid traverse rates in the opposite direction; a one-way right hand feed cycle in which the table starts from the left, quick traverses and then feeds toward the right, after which the table is automatically reversed and quick traversed to a starting position; or a one-way left hand feed cycle in which the table starts from the right, quick traverses and then feeds toward the left, automatically reversed, quick returned to starting position, and automatically stopped.

Figure 8:
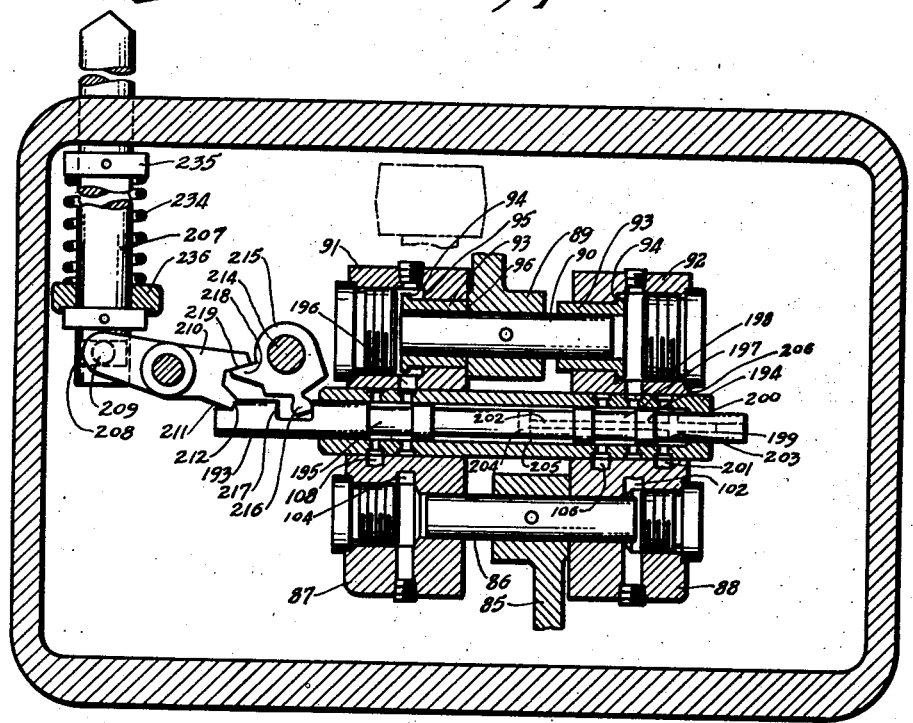
Figure 8 is a section on the line 8—8 of Figure 7.

These cycles are obtained through hydraulically actuated means for shifting the clutches which are more particularly illustrated in Figures 6 and 8. The shifter fork 85 which engages the rapid traverse clutch gear 53 is fixed to a piston rod 86 which is reciprocably mounted at opposite ends in cylinders 87 and 88. The shifter fork 89 for clutch 78 is fixed to a piston rod 90 which is reciprocably mounted at opposite ends in cylinders 91 and 92. These clutches are operated upon the principle that the admission of pressure to one cylinder and the exhaust of fluid from the other cylinder will effect shifting of the clutch in one direction while the reverse connections to these cylinders will effect shifting of the clutch in the opposite direction.

Attention is invited to the fact, however, that the clutch member 89 has a neutral position as previously explained, and therefore additional means have been provided in cylinders 91 and 92 whereby, upon the admission of pressure to both cylinders, the clutches will be moved to a neutral position. This means comprises neutralizing sleeves 93 as more particularly shown in Figure 8, having shoulders 94 formed on one end thereof within the cylinder for limiting outward movement by engagement with the interior face 95 of the cylinder head, whereby upon the admission of pressure to both cylinders the ends 96 of the sleeves will engage opposite sides of the shifter fork and move the same to a neutral position, the shoulders acting to centralize the clutch.

The admission of pressure to these cylinders is under the control of a single valve, operatively coupled to a plunger which is extended to a position adjacent the table for trip actuation by dogs carried thereby. To this end a valve block 97 is provided, as shown in Figure 6, having a cylindrical bore 98 in which is fixed a valve sleeve 99 having reciprocably mounted therein the valve 100. A plurality of equally spaced annular grooves are formed in the periphery of the sleeve, the groove 101 being connected by channel 102 to cylinder 88, the groove 103 being connected by channel 104 to cylinder 87, the groove 105 being connected by channel 106 to cylinder 92, and the groove 107 being connected by channel 108 to cylinder 91.

Pressure is supplied to the valve from a pump 109 which is constantly driven at a uniform rate from the shaft 48 as shown in Figure 6. This pump draws fluid from the reservoir 110 formed in the base of the knee and forces it through channel 111 to the valve block 97. An L-shaped channel 112 conducts the pressure to the annular groove 113 formed in the periphery of the valve sleeve. The valve 100 has a pair of diametrically spaced pressure bores 114 drilled longitudinally thereof and a second pair of bores arranged at right angles to the first pair forming exhaust channels 115 also extending longitudinally thereof as shown more particularly in Figure 7. As shown in Figure 6 the pressure bores 114 are closed at the lower ends by suitable plugs 116, while the exhaust grooves are open at the bottom to permit returning fluid to drain direct to reservoir in the base of the knee.

As previously mentioned the valve 100 is axially adjustable and therefore a wide annular groove 117 is formed in the periphery thereof near the lower end to maintain a constant connection between the pressure port 118 formed in the groove 113 and the ports 119 which connect the groove 117 to the bores 114 so that pressure may be maintained in these bores at all times. A relief valve 120 is mounted in a channel 121 which intersects channel 112 and serves to relieve excess pressure, the escaping oil flowing through channel 122 to a lubricating system 123 from which it returns to reservoir.

Means have also been provided under the control of valve 100 for automatically disconnecting the spindle starting clutch during certain movements of the work table and comprises a pair of cylinders 124 and 125 having a piston rod 126 reciprocably mounted at opposite ends in the cylinders and connected intermediate thereof to crank arm 127 which operates the spindle stop mechanism. The cylinder 124 is connected by channel 128 to groove 129 formed in the sleeve 99 and the cylinder 125 is connected by channel 130 to groove 131.

The spindle stop mechanism serves to automatically disconnect the spindle clutch during movement of the table at a rapid traverse rate in either direction, as well as to prevent engagement of the spindle clutch by the manual control lever 151 during movement of the table at a rapid traverse rate, or while the table is stopped. To this end the crank 127 is fixed to the end of a shaft 132 which is journaled in the knee against axial movement relative to the knee but movable up and down therewith. The lower end of this shaft is splined at 133 in a sleeve 134 which acts as a connector for coupling the shaft 132 to an outer sleeve 135 which is journaled against axial movement in the base of the machine. The bore of the sleeve 135 is splined in the usual manner consisting of three equally spaced grooves 136 but these grooves are relieved for a short distance below the top of the sleeve, the relieved portions extending circumferentially a distance equal to the angular movement of the shaft 132 as effected by its operating cylinders.

The integral keys 137 on the sleeve 134 are of such length that when the sleeve is raised to an elevated position by the eccentric pin 138, mounted on the shaft 139, it will travel through the relieved space 140 without effecting rotation of the outer sleeve 135. In this position of the parts it will be seen that the sleeve 134 disconnects the shaft 133 from the outer sleeve 135 and thereby renders the spindle stop mechanism ineffective.

Figure 2:
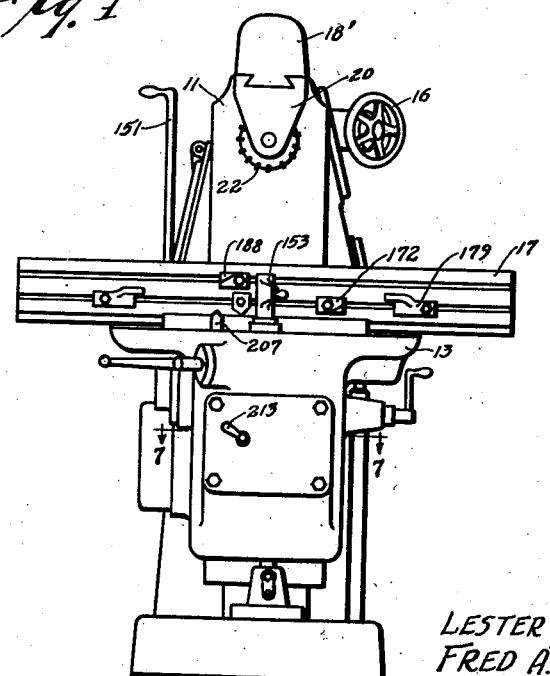
Figure 2 is a front elevation of the machine shown in Figure 1.

The sleeve 135 is connected by a link 141 to a crank arm 142 keyed to the end of a vertical shaft 143 which is journaled in the column against axial movement. A pinion 144 is keyed to the upper end of the shaft 143 and meshes with rack teeth formed in a shifter rod 145 which is operatively connected to the clutch spool 37 by means of the shifter fork 146. The shaft 145 has a groove 147 in which fits the ball-shaped end 148 of the lever 149 which is keyed to one end of a shaft 150. The shaft 150 projects from the left side of the column, as shown in Figures 1 and 2 and has fixed to its projecting end the manual operating lever 151. From this it will be seen that the spindle clutch may be manually operated under certain circumstances as for instance when the shifter rod 146 is disconnected by the sleeve 134 from the power operating cylinders 124 and 125.

Even under these circumstances, however, there is an inter-lock between the spindle clutch and the feed mechanism which prevents feeding of the table into a non-rotating cutter. Assuming that the table and spindle are stopped, the sleeve 135 and inner sleeve 134 will be in the position shown in Figure 5 and upon engagement of the feed clutch, the sleeve 134 will be rotated in a clockwise direction as viewed in this figure, which, through the integral keys 137, will effect rotation of the outer sleeve 135 and thereby engagement of the spindle clutch. While in this new position if the feed is disengaged, the sleeve 134 and its key 137 will return in a counter-clockwise direction without disturbing the sleeve 135, this movement being possible due to the relieved portion 140. From this it should be seen that when the spindle stop mechanism is disengaged, the spindle may be engaged and disengaged at will by the operator to effect rotation of the spindle but that inter-lock means have been provided so that if the feed is engaged while the spindle is stopped the spindle clutch will be automatically engaged and the spindle rotated.

The sleeve 134 is moved downward for positive rotation of the sleeve 135 in either direction by means of the lever 152 fixed to the end of the shaft 139. A locking bolt 153 is threaded in the end of the lever for securing the shaft 139 and thereby the sleeve 134 in either adjusted position. Downward movement of the sleeve 134 will cause engagement of the keyed portions 137 on the sleeve 134 with the splined grooves 136 in the outer sleeve 135 thereby permitting no lost motion between the parts. The spindle clutch is then under the complete automatic control of the power cylinders 124 and 125 which are connected to the valve 100 in the manner previously explained.

Figure 7:
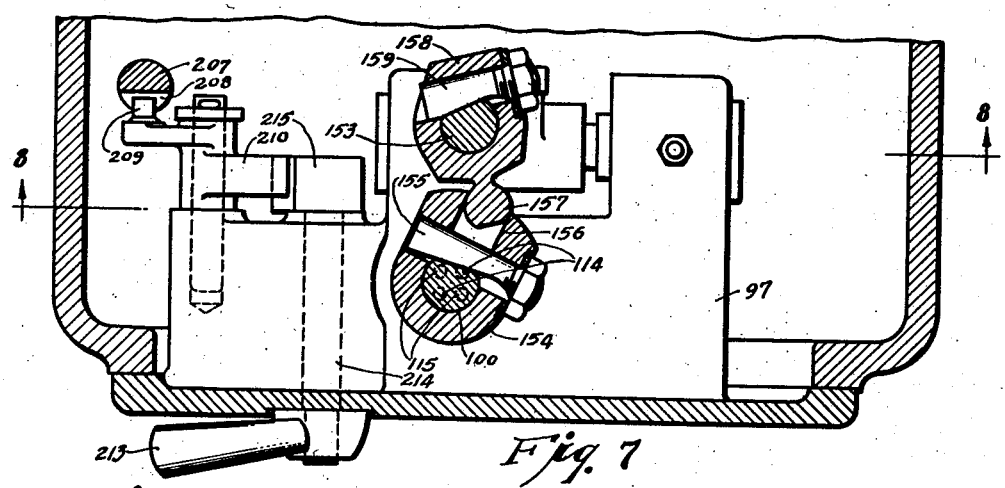
Figure 7 is a section on the line 7—7 of Figure 2.

The valve 100 is connected to the trip plunger 153 by means of the mechanism shown in Figures 7 and 12, comprising a connecting member 154 secured to the upper end of the member 100 by the wedge bolt 155. The tubular end 156 of this member embraces the ball-shaped end 157 of the crank 158 secured to the lower end of the trip plunger as by a wedge bolt 159.

The trip plunger 153 has four positions; that is, an up and rotated counter-clockwise position, which position causes feed movement of the table to the left; a clockwise rotated position which causes quick traverse movement of the table to the right; a down position while still rotated clockwise to effect feed movement of the table to the right, and a counter-clockwise rotated position while down to effect quick traverse movement of the table to the left. These four movements are imparted to the valve 100 by means of the connection just explained. The valve plunger 100 therefore has four positions and the hydraulic connections effected by those four positions with the results obtained thereby will now be explained.

In the ordinary reciprocating cycle the table reciprocates continuously and usually in the following manner, assuming that the table has been stopped in a right hand shifted position. The table will quick traverse toward the left until the work reaches the cutter and then feed to the left. At the completion of the cut, the direction of table movement will be reversed, the table moving at a quick traverse rate toward the right then changing to a feed toward the right, followed by a second reverse and a repetition of the cycle. During movement in either direction as for instance toward the left, the rate of movement may be changed as many times as desired, depending upon the number of work pieces to be milled in a single stroke of the table. For a clearer understanding of the control mechanism, the positions of the valve 100 will be described in this order.

Figure 10:
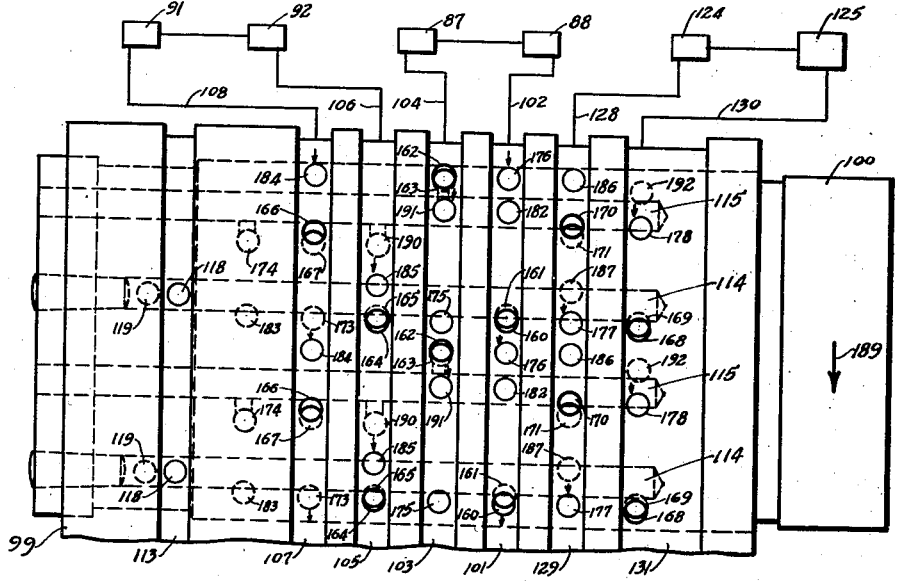
Figure 10 is a view similar to Figure 9 showing the valve axially displaced from Figure 9.

In Figure 10 the valve is shown in a quick traverse left position, which means that the trip plunger 153 has been lowered and rotated counter-clockwise to the position shown in Figure 2. The valve has been shown as a pattern in this figure with the sleeve 99 superimposed thereupon.

To obtain this rate and direction, the clutch gear 53 and clutch 78 must be moved to the left as viewed in Figure 6 which means that pressure must be admitted to cylinders 88 and 92 respectively, while cylinders 87 and 91 must be connected to reservoir to permit this movement. This is effected by providing ports 160 in groove 101 which register with ports 161 intersecting the pressure bores 114 thereby supplying pressure to channel 102; and ports 162 in groove 103 registering with ports 163 intersecting exhaust bores 115.

Cylinder 92 is connected to pressure by means of channel 106, groove 105 having ports 164 therein registering with ports 165 intersecting pressure channels 114. Cylinder 91 is connected to exhaust by channel 108, groove 107 and ports 166 formed therein registering with ports 167 intersecting the exhaust groove 115. Since the table is to move at a quick traverse rate, it is desired that the spindle be stopped and therefore the spindle clutch must be disconnected. Pressure is accordingly admitted to cylinder 125 by channel 130, groove 131 having ports 168 therein registering with pressure ports 169; while cylinder 124 is connected to exhaust by channel 128 and groove 129 having ports 170 therein registering with the exhaust ports 171.

After predetermined movement of the table at a quick traverse rate, the trip plunger 153 will be raised by trip dog 172 to reduce the table movement to a feed rate. This will cause axial movement without rotation of the valve plunger 100 relative to the sleeve 99 to the position shown in Figure 9. Referring to Figure 6 it will be seen that it is only necessary to shift the clutch gear 53 to the right to permit feed element 65 to rotate gear 74 through gear 68 and clutch 70 and thereby impart feed movement to the table. The spindle must be started also and therefore pressure must be admitted to cylinders 87 and 124.

Since the clutch 78 is not moved, pressure will still be admitted to cylinder 92 through channel 106, groove 105, ports 164 registering with new pressure ports 173 which have been brought into registry therewith by axial movement of the plunger 100. Cylinder 91 will still be connected to exhaust through channel 108, groove 107, ports 166 and exhaust ports 174. The longitudinal movement of the valve plunger will also disconnect ports 160 in groove 101 from pressure ports 161; and ports 162 in groove 103 from the exhaust ports 163; and will connect ports 175 in groove 103 with pressure ports 165 thereby permitting pressure to flow through channel 104 to cylinder 87; and also connect ports 176 in groove 101 to the exhaust ports 163 permitting escape of pressure from cylinder 88. Cylinder 124 will be connected to pressure through channel 128, groove 129 and ports 177 registering with pressure ports 161, and cylinder 125 will be connected to exhaust through channel 130, groove 131 and ports 178 registering with the exhaust ports 171. Thus the clutch gear 53 will be disconnected from the feed gear 68 while the clutch 78 will be maintained in connection with feed gear 74 to effect movement of the table at a feed rate; and the spindle clutch 37 will be automatically connected to effect power rotation of shaft 132 and thereby the spindle and cutter.

Figure 9:
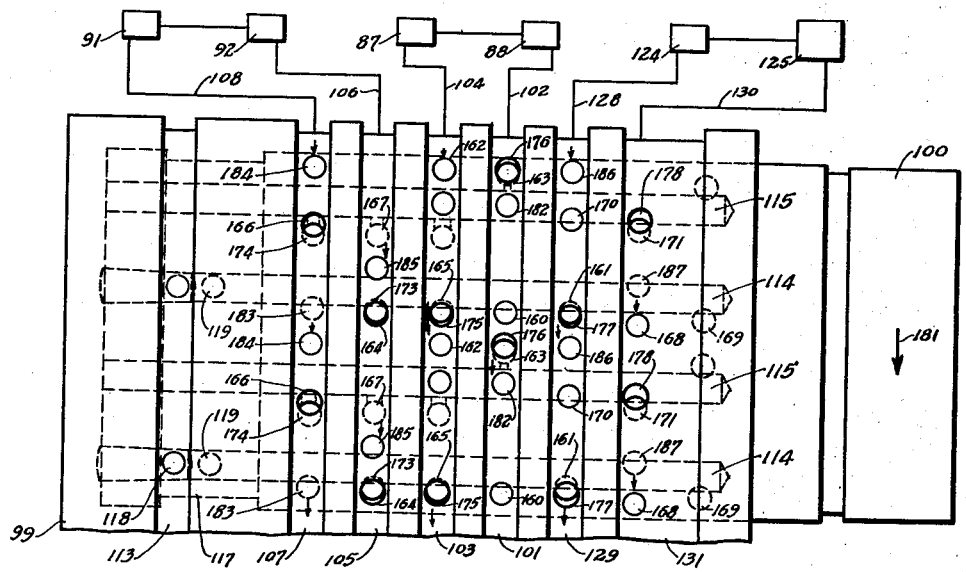
Figure 9 is an expanded view of the rate and direction control valve.

At the termination of the feed movement, the table will be immediately reversed by dog 179 engaging wing 180 of the plunger 153, rotating the plunger in a clockwise direction and thereby rotating the valve 100 in the direction of the arrow 181 as shown in Figure 9. The new position of the valve will disconnect pressure from cylinder 92 and connect the same to exhaust, at the same time reversing the connections to cylinder 91 to thereby move the clutch 78 to the right. Cylinder 125 will be disconnected from exhaust and connected to pressure and cylinder 124 will still be maintained under pressure to thereby stop the spindle. The connections to cylinders 87 and 88 will remain the same, the pressure ports 165 being moved out of register with ports 175 and into register with ports 162 formed in the groove 103 which is connected by channel 104 to cylinder 87. Similarly pressure ports 163 will move out of register with ports 176 and into register with ports 182 formed in groove 101 which is connected to cylinder 88 through channel 102. Thus although the valve has been rotated, these cylinders are still connected to pressure and exhaust in the same manner as before.

The rotated position of the plunger will also disconnect the exhaust ports 174 from ports 166 in groove 107 and simultaneously connect pressure ports 183 with ports 184 in the same groove causing pressure to flow to cylinder 91 through channel 108. Ports 164 in groove 105 will be disconnected from pressure ports 173 while ports 185 in the same groove will be connected to exhaust ports 167 whereby pressure from cylinder 92 may be exhausted through channel 106. Also ports 177, groove 129, will be disconnected from pressure ports 161. Ports 161 move into registry with ports 186 in groove 129 to conduct pressure to cylinder 124. In a similar manner exhaust ports 171 will be disconnected from ports 178 in groove 131, and pressure ports 187 will move into registry with port 168 to conduct pressure to cylinder 125. It will be noted from this that pressure is conducted to both cylinders 124 and 125, but since the area of the piston in cylinder 125 is greater than the area of piston 124, the piston rod 126 will move in a direction to disconnect the spindle clutch.

Upon approach of the work to the cutter during rapid traverse movement of the table to the right, a dog 188 will depress plunger 153 thereby moving the valve 100 downward to the position shown in Figure 10 but rotated in a direction indicated by arrow 189 in that figure. In this position pressure ports 173 will be connected to ports 184 in groove 107 thereby connecting pressure to channel 108 and cylinder 91 to maintain the feed clutch 78 shifted to the right, while cylinder 92 will be connected to exhaust through channel 106, groove 105, and ports 185 in the groove registering with exhaust ports 190. Also exhaust ports 163 will be moved into registry with ports 191 in groove 103, connecting cylinder 87 to exhaust through channel 104. Pressure ports 161 will be moved into registry with ports 176 in groove 101 connecting pressure to cylinder 88 through channel 102 shifting clutch gear 53 to the left. Pressure ports 187 will be moved into registry with ports 177 in groove 129 connecting pressure to channel 128 and thus to cylinder 124 to effect rotation of the cutter, the opposite cylinder 125 being connected to exhaust through channel 130, groove 131 and ports 178 which will be in registry with ports 192 connected to the exhaust grooves 115.

From the foregoing description it will be seen that by proper positioning of the trip dogs, the table may be continuously reciprocated at feed and rapid traverse rates in both directions. Since the plunger has no stop position, additional means must be provided for stopping the table, which is illustrated more particularly in Figure 8. As there shown a stop valve plunger 193 is reciprocably mounted in a sleeve 194 fixed in the valve casing 97. This valve plunger has an annular groove 195 which in the position shown connects channel 108 to the port 196 of cylinder 91, and a second annular groove 197 which connects channel 106 to port 198 of cylinder 92. The reduced end 199 of the plunger passes through the end 200 of the sleeve which is closed to form a cylinder to which pressure is admitted through a channel 201 which intersects the channel 112 formed in the block 97 as shown in Figure 6.

An axial bore 202 is formed in the valve 193 having a radial port 203 connecting with pressure channel 201, and a port 204 at the other end connected to the annular groove 205 formed in the middle of the plunger. From this it will be seen that pressure will be continuously acting against the end of the valve spool 206 to shift the same toward the left and at the same time the annular groove 205 will be constantly under pressure.

In order to stop the machine it is necessary to move the clutch 78 to a neutral position by admitting pressure to cylinders 91 and 92 and to insure centralization, the sleeves 93 previously described have been provided. Movement of the valve plunger 193 to the left from the position shown will disconnect the channel 108 from port 196 and connect said port to the annular pressure groove 205. It will also simultaneously disconnect channel 106 from port 198 and connect the port to the pressure in the cylinder formed at the end of the sleeve 200. By this means, irrespective of what the previous connections to channels 106 and 108 were, it will be insured that pressure will be admitted to both cylinders and thereby the clutch moved to a neutral position. Also return movement of the plunger will connect the cylinders 91 and 92 in the same manner as previously connected thereby permitting the machine to continue its cycle.

The plunger 193 is adapted to be moved by either manual or automatic means. To this end a stop plunger 207 is reciprocably mounted adjacent the edge of the table for trip actuation by table dogs the plunger being held normally in an elevated position by spring 234 interposed between collar 235 fixed therewith and the fixed port 236 of the machine. The end of the plunger has a groove 208, receiving a pin 209 fixed in the end of a pivoted lever 210. The opposite end of this lever has a latch finger 211 which, in the raised position of the stop plunger, engages the bevel surface 212 formed on the end of valve plunger 193. This maintains the valve in a shifted right position against the urge of the hydraulic pressure in the cylinder 200 acting on the spool 206. It will now be apparent that upon depression of the stop plunger as by a dog carried by the table, that the finger 211 will be moved out of engagement with surface 212 and the plunger 193 will immediately be shifted to the left by hydraulic pressure.

Manual operation is effected by a stop lever 213 secured to the end of shaft 214 which has keyed thereto a collar 215 having ball-ended crank 216 projecting into a groove 217 formed in the periphery of the plunger 193. It will be seen that rotation of the stop lever in a counter-clockwise direction will effect return of the stopping plunger to the position shown. In order to permit movement in a clockwise direction the collar 215 has been provided with a second lug 218 engageable with the bevel surface 219 formed on the end of the lever 210 whereby the same will be rotated to effect disengagement of the latch finger 211. A certain amount of lost motion is provided between the plunger 193 and lug 216 by elongating groove 217 so that the finger will be withdrawn before engagement of the lug. The stop valve may thus be utilized to stop the machine at any point during its operation while the automatic stop plunger makes it possible to change the cycle of the machine from a reciprocating cycle to a one-way cycle.

Means have been provided, as shown in Figures 11 and 12, for holding the trip plunger 153 and thereby the valve 100 in any of its adjusted positions to which it may be rotated or axially shifted. To this end a detent carrier 220 is rotatably mounted in a bushing 221 fixed to the bed of the machine, the carrier being held against longitudinal movement with respect to the bushing by a member 222 threaded on one end and engaging the end of the bushing. The carrier is connected to the plunger 153 by means of splines 223 whereby rotational movement of the plunger will effect rotation of the carrier, while on the other hand the plunger 153 is capable of axial movement relative to the carrier. Since the carrier does not move axially, it is provided with means for detaining the plunger 153 and thereby the valve 100 in either one of its vertical positions comprising a spring pressed ball or detent 224 mounted in the end of a bore 225 formed in the carrier and alternately engagable with conical shaped notches 226 spaced axially of the plunger 153. Since the carrier and trip plunger rotate together it will be seen that the pair of detent notches will be sufficient for retaining the parts irrespective of the oscillated position of the plunger in which the vertical movement takes place.

Since the carrier 220 and plunger 153 rotate together, the detent mechanism for the rotational movement may just as well be applied to the carrier 220 as directly to the plunger 153 and for that reason the carrier is provided on its periphery with a pair of indentations 227, as shown in Figure 11, which cooperate with a pivoted detent 228 which is held in engagement with the notches by means of a spring 229. Since the valve 100 and the plunger 153 have considerable weight, it is desirable to counterbalance these parts in order that the trip plunger may function easily and quickly and to this end a spring 230 is interposed between a fixed surface 231 of the bed and a collar 232 carried by the plunger 153. The spring should not be heavy enough to overcome the pressure of the detent members 224 but just sufficient to permit easy movement of the parts in both directions.

A milling machine transmission and control mechanism has thus been provided comprising a simple mechanical transmission having complete hydraulically actuated rate and direction control means under the direction of a single trip controlled plunger, together with hydraulically actuated spindle stop mechanism coupled to the same valve for automatic operation thereby.

What is claimed is:

1. A transmission and control mechanism for a milling machine comprising a feed transmission, a rapid traverse transmission, said transmissions terminating in rate and direction determining clutches, a trip actuated control plunger for effecting positioning of said clutches, said plunger being rotatable and reciprocable, detent mechanisms for retaining the plunger in any of its positions including a rotatable detent carrier mounted in the support and surrounding said plunger, detents mounted in the carrier for retaining the plunger in either axially shifted position, means coupling the carrier to the plunger for joint rotation, and means engaging the periphery of the carrier to retain the parts against rotation.

2. A transmission and control mechanism for a milling machine comprising a feed transmission, a rapid traverse transmission, said transmissions terminating in rate and direction determining clutches, a trip actuated control plunger for effecting positioning of said clutches, said plunger being rotatable and reciprocable, detent mechanisms for retaining the plunger in any of its positions including a rotatable detent carrier mounted in the support and surrounding said plunger, detents mounted in the carrier for retaining the plunger in either axially shifted position, means coupling the carrier to the plunger for joint rotation, means engaging the periphery of the carrier to retain the parts against rotation, and means to counter-balance the weight of the plunger to permit quick positioning of the plunger by the detents during axial movement thereof.

3. A milling machine having a column, a knee adjustably mounted on the column, a table reciprocably mounted upon the knee, a power actuated transmission mounted in the knee for effecting reciprocation of the table including a plurality of control clutches, a vertically extending control valve mounted in the forward part of the knee for determining the position of said clutches, trip actuated control means for positioning said valve, one of said positioning movements being vertical, and means to counter-balance the valve to facilitate the vertical movement thereof by said trip controlled means.

4. A milling machine having a column, a knee adjustably mounted upon the column, a table reciprocably carried by the knee, a power transmission mounted in the knee for effecting said reciprocation including a pair of control clutches, hydraulically actuated means for shifting said clutches, a control valve, a reservoir mounted in the knee, a pump mounted in the reservoir for delivering pressure to the valve, trip control means adjacent the table for positioning the valve in successive positions to effect a continuous reciprocating cycle, and a stop valve interposed between the control valve and said hydraulically actuated means to terminate movement of the table.

5. A transmission for a machine tool comprising rate and direction determining clutches, a pair of opposed cylinders for each clutch, pistons mounted in the cylinders and operatively coupled to the respective clutches, a control valve for determining the admission of pressure to said cylinders and thereby the position of said clutches, said direction determining clutch having a neutral position to stop movement of the table, and a stop valve interposed between the control valve and said direction determining clutch, said stop valve being movable to one position to couple both cylinders of the clutch to the control valve, an independent pressure line to the stop valve, and means to shift the stop valve to couple said pressure line simultaneously to both cylinders to thereby move the clutch to a neutral position.

6. A transmission for a machine tool comprising rate and direction determining clutches, a pair of opposed operating cylinders for each clutch, pistons mounted in each cylinder pair, and operatively coupled to the respective clutches, a control valve for determining the admission of pressure to said cylinders and thereby the position of said clutches, one of said clutches having a neutral position to stop movement of the table, and a stop valve interposed between the control valve and the respective cylinders of said clutch, said stop valve being movable to one position to couple both cylinders to the control valve, an independent pressure line to the stop valve, and means to shift the stop valve to couple said pressure line simultaneously to both cylinders to thereby move the clutch to a neutral position, said means comprising a shifting cylinder and a branch line coupling the independent pressure line to the shifting cylinder.

7. A transmission for a machine tool comprising rate and direction determining clutches, a pair of opposed cylinders for each clutch, pistons mounted in each cylinder and operatively coupled to the respective clutches, a control valve for determining the admission of pressure to said cylinders and thereby the position of said clutches, one of said clutches having a neutral position to stop movement of the table, and a stop valve interposed between the control valve and said last named clutch, said stop valve being movable to one position to couple both clutch cylinders to the control valve, an independent pressure line to the stop valve and hydraulically actuated means for shifting the stop valve to the opposite position and thereby couple both clutch cylinders to the pressure line and a branch line from said independent pressure line for supplying pressure to said hydraulically actuated means.

8. A transmission and control mechanism for a machine tool including rate and direction determining clutches, pressure actuated means for shifting said clutches, a control valve for determining the admission of pressure to said shifting means, a stop valve interposed between the control valve and one of said clutches, said stop valve including a reciprocable plunger, an independent pressure line to the stop valve, means to shift the stop valve to a position coupling the control valve to the direction determining clutches, a latch lever for holding said plunger in operating position, trip controlled means for releasing said latch lever, and hydraulically operated means for shifting the plunger to stop position upon release from said latch.

9. A transmission and control mechanism for a machine tool including rate and direction determining clutches, pressure actuated means for shifting said clutches, a control valve for determining the admission of pressure to said shifting means, a stop valve interposed between the control valve and one of said clutches, said stop valve including a reciprocable plunger, an independent pressure line to the stop valve, means to shift the stop valve to a position coupling the control valve to the direction determining clutches, a latch lever for holding said plunger in this position, trip controlled means for releasing said latch lever, hydraulically operated means for returning the plunger to stop position upon release from said latch, and manual operating means for operating said latch independent of the automatic control means therefor.

10. In a machine tool having a plurality of pressure actuated control clutches and a control valve therefor, a stop valve interposed between the control valve and one of said clutches, said valve including a plunger reciprocable to one position to neutralize the direction determining clutch, a latch lever for maintaining said plunger in the shifted position, a rotatable shaft, a crank arm carried by the shaft for effecting reciprocation of the plunger in one direction, a trip finger carried by the shaft for releasing said latch lever, and lost motion means between the crank arm and the plunger permitting rotation of the shaft independent of the plunger to release the latch lever and pressure actuated means for returning the plunger to a neutral position.

11. A milling machine having a column, a cutter spindle journaled in the column, a prime mover mounted in the column, a clutch for coupling the spindle to the prime mover, a knee mounted on the column, a work table reciprocably mounted upon the knee, a transmission for the table coupled to the prime mover including rate and direction determining clutches mounted in the knee, hydraulic means for shifting the table transmission clutches, pressure actuated means mounted in the knee for reciprocating the spindle clutch mounted in the column, and a single trip actuated control valve mounted in the knee adjacent the table for determining operation of all of said pressure actuated devices.

12. A milling machine having a column, a transmission chamber mounted in the upper part of the column, a transmission mounted in said chamber including a drive shaft, a motor chamber mounted in the lower part of said column, a pivoted support mounted in said motor chamber, the axis of said pivot being parallel to said drive shaft, a prime mover mounted upon said pivoted support, the axis of the prime mover being parallel to the axis of the pivot, a multiple V-belt drive coupling the prime mover to the drive shaft, a threaded member for effecting adjustment of the pivoted support and thereby the tension and power transmitting capacity of the V-belt drive, additional threaded means for effecting adjustment of the pivoted support from the drive shaft, and means to lock each of said adjusted means whereby the pivoted support will be retained in a permanent position.

13. A milling machine having a rotatable cutter spindle, and a work support movable relative thereto, a drive shaft, a prime mover coupled to the shaft for constant rotation thereby, a spindle transmission, a clutch for coupling the transmission to the drive shaft for actuation thereby, said clutch comprising one part fixed to the drive shaft, and a shiftable part coupled to the transmission, a gear fixed with each part of the clutch, whereby one will be constantly rotated and the other subject to rotation upon engagement of the clutch, a feed transmission to the work support, a reversible gear, means to mount the gear selectively in one position to connect the feed transmission to the constantly rotated gear, or in reverse position to connect the feed transmission to the other gear whereby in the latter position the work support will be jointly controlled with the cutter spindle by said clutch.

14. A milling machine having a column, a cutter spindle journaled in the column, a knee adjustably mounted upon the column, a work support reciprocable transversely of the knee, a spindle transmission in the column including a starting clutch, a power actuated transmission mounted in the knee for effecting reciprocation of the work support including rate and direction determining clutches, hydraulically actuated means mounted in the knee for shifting the starting clutch, and a self-contained hydraulic system mounted in the knee for controlling operation of all of said hydraulic actuated means.

15. In a transmission and control mechanism for machine tools the combination of a first member shiftable to a first and second position respectively productive of different effect from said transmission, fluid operable shifting elements respectively operable to shift said member to the different of said positions, a second member also shiftable to a first and second position and operable while the first member remains in a given position to change the effect thereof, fluid operable shifting elements respectively operable to shift the second member to its different positions, a source of fluid pressure and a single valve for selectively coupling the various shifting elements to pressure for independent movement of said members.

16. In a transmission and control mechanism for machine tools the combination of a first clutch member shiftable to a first and second position for producing different effects from said transmission, individual fluid actuable elements for shifting said clutch to its different positions, a second clutch member shiftable to a first and second position, said shifting movement changing the effect produced by the first clutch member, fluid operable shifting elements for shifting said second clutch member to its different positions, a source of fluid pressure and a single valve member movable to different positions respectively for coupling pressure to the different fluid actuable elements whereby either clutch member may be independently moved to its various positions.

17. In a transmission and control mechanism for machine tools the combination of a first member shiftable to a first and second position respectively productive of different effect from said transmission, fluid operable shifting elements respectively operable to shift said member to the different of said positions, a second member also shiftable to a first and second position and operable while the first member remains in a given position to change the effect thereof, fluid operable shifting elements respectively operable to shift the second member to its different positions, a source of fluid pressure and a single valve for selectively coupling the various shifting elements to pressure for independent movement of said members, one of said members having a third position and an additional valve for simultaneously coupling pressure to the fluid operable shifting elements of the three position member to produce an additional effect from said transmission.

18. In a transmission and control mechanism for machine tools the combination of a first clutch member shiftable to a first and second position for producing different effects from said transmission, individual fluid actuable elements for shifting said clutch to its different positions, a second clutch member shiftable to a first and second position, said shifting movement changing the effect produced by the first clutch member, fluid operable shifting elements for shifting said second clutch member to its different positions, a source of fluid pressure, a single valve member movable to different positions respectively for coupling pressure to the different fluid actuable elements whereby either clutch may be independently moved to its various positions, said first clutch member having a third position, and an additional valve for coupling the pressure to the fluid operable clutch shifting elements to move the first clutch to its third position whereby no motion will be imparted by the transmission.

19. In a transmission and control mechanism for a machine tool having a prime mover, a first branch transmission for effecting rotation of a cutter and a second branch transmission for effecting relative movement between cutter and work, the combination of a clutch member for coupling the first branch transmission to the prime mover, a clutch member in the second branch transmission movable to a plurality of positions respectively productive of different effect from said transmission, a third clutch member in the second branch transmission shiftable to a plurality of positions for changing the effect produced by the first clutch member in said second branch transmission, separate pairs of fluid operable shifting elements associated with each shiftable clutch and respectively operable to shift said clutches to their different positions, a source of fluid pressure and a single valve for determining the shifting elements of said clutches to be actuated by said pressure.

20. In a transmission and control mechanism for a machine tool having a rotatable cutter, a relatively movable work support, a prime mover and branch transmissions extending therefrom to the movable parts, the combination of a clutch member in the first branch transmission shiftable to a first and second position respectively productive of different effect from said transmission, fluid operable shifting elements respectively operable to shift said member to the different of said positions, a second clutch member shiftable to a first and second position and operable while the first clutch member remains stationary to change the effect thereof, fluid operable shifting elements for shifting the second clutch member to its respective positions; a third clutch member in the second branch transmission shiftable to a first and second position to determine coupling and uncoupling of the branch transmission to the prime mover, fluid operable shifting members separately operable to shift the third member to its different positions, a source of fluid pressure and a single control valve for determining pressure actuation of all of said shiftable members.

21. In a milling machine having a cutter spindle and a work support movable transversely of the spindle, the combination of means for effecting movement of said parts including a prime mover, a rate changer coupled to the spindle, a clutch for connecting and disconnecting the rate changer with the prime mover, a table transmission, said transmission including a pair of clutches respectively positionable for determining the rate and direction of movement of the table, individual pairs of fluid operable shifting elements respectively operable to shift said members to their different positions, each of said elements including a piston and cylinder, one of which is connected to the movable element, an hydraulic control circuit including a pump continuously actuated by the table transmission, a control valve, individual channels extending from the control valve to each cylinder, said valve being rotatable to a first and second position, means in the valve and effective when in said positions to connect certain cylinders to pressure to yield a feed rate in one direction and a quick traverse rate in the opposite direction, said valve being longitudinally movable from each of said positions to change the cylinder connections and thereby the rate effected by the first positions, and additional means in the valve for effecting engagement of the spindle clutch when the transmission yields a feed rate and disconnection of the spindle clutch when the transmission yields a rapid traverse rate.

22. In a transmission and control mechanism for machine tools, the combination of a first member shiftable to a first, second and third position respectively productive of different effect from said transmission, fluid operable shifting elements respectively operable to shift said member to the different of said positions, a second shiftable member movable to a first and second position and operable while the first member remains in a given position to change the effect thereon, a pair of fluid operable shifting elements respectively operable to shift the second member to its different positions, a source of fluid pressure, a single control valve, a first pair of channels extending from the valve respectively to the first pair of fluid operable shifting elements, a second pair of channels extending respectively to the second pair of fluid operable shifting elements, means for moving said valve to effect individual actuation of said elements and a second valve interposed in the first pair of channels for simultaneously actuating the first pair of shiftable elements and moving the first member to its third position.

23. In a transmission and control mechanism for machine tools, the combination of a first member shiftable to a first, second and third position respectively productive of different effect from said transmission, fluid operable shifting elements respectvely operable to shift said member to the different of said positions, a second shiftable member movable to a first and second position and operable while the first member remains in a given position to change the effect thereon, a pair of fluid operable shifting elements respectively operable to shift the second member to its different positions, a source of fluid pressure, a single control valve, a first pair of channels extending from the valve respectively to the first pair of fluid operable shifting elements, a second pair of channels extending respectively to the second pair of fluid operable shifting elements, means for moving said valve to effect individual actuation of said elements, a second valve interposed in the first pair of channels for simultaneously actuating the first pair of shiftable elements and moving the first member to its third position, a common supply line from said source to said valves, and a relief valve in said line to by-pass the fluid during non-actuation of said shiftable elements.

24. A milling machine having a column, a knee adjustably mounted on the column, a work support reciprocable transversely of the knee, a power actuated transmission mounted in the knee for effecting said reciprocation including rate and direction determining clutches, hydraulically actuated means for shifting said clutches, a single control valve mounted in the knee, means coupling the clutches to said valve for joint control thereby, and manual and trip controlled means operable from the table for positioning said valve.

25. In a milling machine having a cutter spindle and a work table, the combination of a transmission for effecting relative movement therebetween, comprising parallel trains terminating in coaxial oppositely rotatable rotors, a constant speed shaft, a feed transmssion and a rapid traverse transmission driven by said shaft, means coupling the transmissions to the respective trains for simultaneous actuation thereby at different rates, a table drive shaft, a clutch for selectively coupling said rotors to the table drive shaft whereby work at one end of the table will be advanced at a feed rate and retracted at a rapid traverse rate relative to the cutter spindle, a power train driven by the constant speed shaft for shifting said clutch including a pump, a control valve and fluid operable shifting means in the order recited, and means operatively connected to said valve and extending into the path of dogs carried by the table for automatically shifting said valve.

26. In a milling machine having a cutter spindle and a work table, the combination of a transmission for effecting relative movement therebetween, including parallel trains terminating in coaxial oppositely rotatable rotors, a table drive shaft, a clutch for selectively coupling the rotors for opposite movement of the table, a constantly driven feed transmission and rapid traverse transmission, means to couple simultaneously the individual transmissions to the respective trains for simultaneous actuation thereby at different rates whereby the table will advance along a path at a feed rate and return along said path at a rapid traverse rate, means to reverse the coupling between said transmissions and the respective trains to thereby change the rate of said advancing and return movement of the table whereby the table may effect a left hand feed cycle or a right hand feed cycle, a power train for individually effecting said changes in rate and direction including a pump, a control valve and individual fluid actuable means for effecting said changes, means to shift the valve axially to select the cycle of table movement, and means to rotate the valve to change the direction of movement for either cycle.

27. In a milling machine having a cutter spindle and a work table, the combination of a transmission for effecting relative movement therebetween including parallel trains terminating in coaxial oppositely rotatable rotors, a table drive shaft, a clutch for selectively coupling the rotors for opposite movement of the table, a constantly driven feed transmission and rapid traverse transmission, means to couple simultaneously the individual transmissions to the respective trains for simultaneous actuation thereby at different rates whereby the table will advance along a path at a feed rate and return along said path at a rapid traverse rate, means to reverse the coupling between said transmissions and the respective trains to thereby change the rate of said advancing and return movement of the table whereby the table may effect a left hand feed cycle or a right hand feed cycle, a power train for individually effecting said changes in rate and direction including a pump, a control valve and individual fluid actuable means for effecting said changes, means to shift the valve axially to select the cycle of table movement, means to rotate the valve to change the direction of movement for either cycle, and a stop valve selectively operable for stopping the table after each cycle of movement.

28. In a milling machine having a cutter spindle and a work table the combination of transmission means for effecting relative movement therebetween including parallel trains terminating in coaxial oppositely rotatable rotors, a table drive shaft, a first clutch for selectively coupling the rotors for opposite rotation of said shaft, a feed transmission and a rapid traverse transmission, a constantly driven shaft for actuating said transmissions, clutch means for individually connecting the transmissions to the respective trains for simultaneous actuation thereby at different rates, fluid actuable means effective on said clutch means to reverse the coupling between said transmissions and the respective trains to thereby change the rate of table movement as respects its direction, additional fluid actuable means for shifting the first clutch, a power train operatively connected to the constantly driven shaft for individually shifting the various clutches including a pump, a control valve, means to shift the valve axially to select the rate as respects the direction, said valve having a first portion thereon extending into the path of one set of dogs carried by the table to change the rate during uni-directional movement of the table, and a second portion for changing the rate during continuous movement in an opposite direction, other portions on the valve and engageable by other dogs on the table for rotating the valve to change the direction of movement automatically, and additional means including a stop valve and a cooperating dog on the table for stopping the table intermediate its stroke, and manual means for re-engaging said valve.

LESTER F. NENNINGER.
FRED A. HASSMAN.